(12) United States Patent
Kawamori (10) Patent No.: US 7,674,343 B2
(45) Date of Patent: Mar. 9, 2010

(54) METHOD OF MANUFACTURING DOUBLE-GLAZING, AND SPACER FORMING DEVICE USED FOR THE MANUFACTURING METHOD

(75) Inventor: Yuji Kawamori, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 873 days.

(21) Appl. No.: 10/559,848

(22) PCT Filed: Jun. 25, 2004

(86) PCT No.: PCT/JP2004/008974

§ 371 (c)(1),
(2), (4) Date: Dec. 7, 2005

(87) PCT Pub. No.: WO2005/000764

PCT Pub. Date: Jan. 6, 2005

(65) Prior Publication Data

US 2006/0151089 A1    Jul. 13, 2006

(30) Foreign Application Priority Data

Jun. 26, 2003    (JP) .............................. 2003-182415

(51) Int. Cl.
C03C 29/00    (2006.01)
(52) U.S. Cl. ..................... 156/109; 417/240; 417/242; 417/258
(58) Field of Classification Search ................... 156/99, 156/104, 106, 107, 109; 222/135, 134; 417/62, 417/240, 242, 258, 211.5
See application file for complete search history.

(56) References Cited

U.S. PATENT DOCUMENTS

| 4,363,426 | A | * | 12/1982 | Heinzl et al. | ................. | 222/134 |
| 4,957,572 | A | * | 9/1990 | Dewitte et al. | ............... | 156/109 |
| 5,961,759 | A | | 10/1999 | Schubert | | |
| 2003/0101664 | A1 | * | 6/2003 | Trpkovski | .................. | 52/171.3 |

FOREIGN PATENT DOCUMENTS

JP    08-067537    3/1996

(Continued)

OTHER PUBLICATIONS

International Search Report, Aug. 24, 2004.

(Continued)

*Primary Examiner*—Richard Crispino
*Assistant Examiner*—Christopher Schatz
(74) *Attorney, Agent, or Firm*—Greer, Burns & Crain, Ltd.

(57) ABSTRACT

A spacer forming device according to the present invention includes glass plate fixing means for fixing one glass plate, an applicator head for applying a spacer forming material, spacer forming material supply means having an extruding means that extrudes the spacer forming material while melting and mixing the material and a fixed displacement pump for supplying the spacer forming material extruded from the extruding means to the applicator head, and an articulated robot that moves the applicator head along the periphery of the one glass plate. By using the spacer forming device, the spacer forming material is applied from the applicator head along the periphery of the upper surface of the one glass plate thereon to form a spacer.

3 Claims, 8 Drawing Sheets

FOREIGN PATENT DOCUMENTS

| | | |
|---|---|---|
| JP | 10-110072 | 4/1998 |
| JP | 10-511072 | 12/1998 |
| JP | 2000-119537 | 4/2000 |
| JP | 2000-246780 | 9/2000 |
| JP | 2001-277330 | 10/2001 |
| JP | 2001-354949 | 12/2001 |

OTHER PUBLICATIONS

Partial English language translation of Japanese Office Action dated Jan. 23, 2009 for corresponding Japanese Patent Application No. 2005-380038. (Japanese language Office Action was previously submitted Feb. 9, 2009).

* cited by examiner

Fig. 18

METHOD OF MANUFACTURING DOUBLE-GLAZING, AND SPACER FORMING DEVICE USED FOR THE MANUFACTURING METHOD

TECHNICAL FIELD

The present invention relates to a method of manufacturing double glazing, and a spacer forming device used for the manufacturing method. More particularly, the present invention relates to a method of manufacturing double glazing and a spacer forming device used for the manufacturing method, which can ensure a stable airtight effect for an air space and can use spacer forming materials other than hot-melt type materials.

TECHNICAL BACKGROUND

In a construction field and the like, double glazing has been heretofore used for the purpose of heat insulation; dew condensation prevention, sound insulation and the like. As such double glazing, there has been known double glazing having glass plates, a spacer placed between the peripheries of the glass plates and an airtightly sealed air space defined by the spacer between the glass plates, the spacer being formed of rubber, resin or the like having a drying agent mixed therein, the airtightly sealed air space being shut out from ambient air (see Japanese patent application Kokai publication Nos. 10 (1998)-110072 and 2001-354949, for example).

The double glazing described above is manufactured, for example, by extruding a spacer forming material from an extruder along the peripheries of two glass plates held with a predetermined space therebetween, before the material is cooled (see Japanese patent application Kokai publication No. 8 (1996)-67537, for example).

There is also a method of manufacturing double glazing by extruding a spacer forming material in a strip shape along the periphery of one glass plate thereon using a ram pressure type device, before press-attaching the other glass plate thereon.

However, in the former method, since the spacer forming material is extruded directly from the extruder, the cross-sectional shape of the extruded spacer forming material becomes unstable when the extrusion is started and finished. Thus, there is a problem that an airtight effect for the air space provided by the formed spacer becomes unstable.

In the latter method, since the ram pressure type device is used to apply the spacer forming material, a hot-melt type material is required to be used as the spacer forming material. Thus, there is a problem that the type of the spacer forming material to be used is limited.

DISCLOSURE OF THE INVENTION

It is an object of the present invention to provide a method of manufacturing double glazing and a spacer forming device used for the manufacturing method, which can ensure a stable airtight effect for an air space and can use spacer forming materials other than hot-melt type materials.

In order to achieve the above object, a first method of manufacturing double glazing according to the present invention is a method of manufacturing double glazing having glass plates, a spacer disposed between peripheries of the glass plates, and an airtightly sealed air space surrounded by the spacer between the glass plates, the method using a spacer forming device including an applicator head for applying a spacer forming material, and spacer forming material supply means having an extruding means that extrudes the spacer forming material while melting and mixing the material and a fixed displacement pump for supplying the spacer forming material extruded from the extruding means to the applicator head, the method comprising the steps of applying the spacer forming material from the applicator head along the periphery of an upper surface of one of the glass plates thereon to form the spacer; and attaching by press the other one of the glass plates to the spacer.

A second method of manufacturing double glazing according to the present invention is a method of manufacturing double having glass plates, a spacer disposed between peripheries of the glass plates, an airtightly sealed air space surrounded by the spacer between the glass plates, and a sealing agent layer disposed outwardly of the spacer between the glass plates, the method using a spacer forming device including an applicator head for applying a spacer forming material, and spacer forming material supply means having an extruding means that extrudes the spacer forming material while melting and mixing the material and a fixed displacement pump for supplying the spacer forming material extruded from the extruding means to the applicator head, the method comprising the steps of applying the spacer forming material from the applicator head along the periphery of an upper surface of one of the glass plates onto a part of the periphery spaced apart from an edge of the periphery by a predetermined length to form the spacer; attaching by press the other one of the glass plates to the spacer; and forming the sealing agent layer outwardly of the spacer between the glass plates.

A spacer forming device according to the present invention used in the above first and second methods is a spacer forming device for forming a spacer disposed between peripheries of glass plates of double glazing, comprising: glass plate fixing means for fixing one of the glass plates; an applicator head for applying a spacer forming material; spacer forming material supply means having an extruding means that extrudes the spacer forming material while melting and mixing the material and a fixed displacement pump for supplying the spacer forming material extruded from the extruding means to the applicator head; and an articulated robot that moves the applicator head along the periphery of the one of the glass plates.

As described above, since the spacer is formed by use of the spacer forming material supply means having a fixed displacement pump for supplying the spacer forming material to the applicator head, a fixed amount of the spacer forming material can be constantly applied from the applicator head. Thus, the cross-sectional shape of the spacer forming material that has been applied becomes stable when the application is started and is also finished. Consequently, a stable airtight effect for the air space can be obtained.

By adopting the spacer forming material supply means having an extruding means that extrudes the spacer forming material while melting and mixing the material, a spacer forming material other than that of a hot-melt type can also be melted and mixed by the extruding means and supplied to the applicator head. Thus, the spacer forming material is not limited to the hot-melt type, but various types of spacer forming materials can be used.

A third method of manufacturing double glazing according to the present invention is a method of manufacturing double glazing having glass plates, a spacer disposed between peripheries of the glass plates, and an airtightly sealed air space surrounded by the spacer between the glass plates, the spacer having sealing agent layers on upper and lower surfaces thereof, the method using a spacer forming device including an applicator head for applying a spacer forming material and a sealing agent in a layered state, spacer forming material supply means having an extruding means that extrudes the spacer forming material while melting and mixing the material and a fixed displacement pump for supplying the spacer forming material extruded from the extruding means to the applicator head, and sealing agent supply means having a fixed displacement pump for supplying the sealing agent to the applicator head, the method comprising the steps of: applying the spacer forming material and the sealing agent in a layered state from the applicator head along the periphery of an upper surface of one of the glass plates thereon to form the spacer having the sealing agent layers on the upper and lower surfaces; and attaching by press the other one of the glass plates to the spacer via the sealing agent layer on the upper surface of the spacer.

A fourth method of manufacturing double glazing according to the present invention is a method of manufacturing double glazing having glass plates, a spacer disposed between peripheries of the glass plates, primary sealing agent layers disposed on upper and lower surfaces of the spacer, an airtightly sealed air space surrounded by the spacer between the glass plates, and a secondary sealing agent layer disposed outwardly of the spacer between the glass plates, the method using a spacer forming device including an applicator head for applying a spacer forming material and a primary sealing agent in a layered state, spacer forming material supply means having an extruding means that extrudes the spacer forming material while melting and mixing the material and a fixed displacement pump for supplying the spacer forming material extruded from the extruding means to the applicator head, and primary sealing agent supply means having a fixed displacement pump for supplying the primary sealing agent to the applicator head, the method comprising the steps of applying the spacer forming material and the primary sealing agent in a layered state from the applicator head along the periphery of an upper surface of one of the glass plates onto a part of the periphery spaced apart from an edge of the periphery by a predetermined length to form the spacer having the primary sealing agent layers on the upper and lower surfaces; attaching by press the other one of the glass plates to the spacer via the primary sealing agent layer on the upper surface of the spacer; and forming the secondary sealing agent layer outwardly of the spacer between the glass plates.

A spacer forming device according to the present invention used in the above third and fourth methods is a spacer forming device for forming a spacer disposed between peripheries of glass plates of double glazing, the spacer having sealing agent layers on opposite surfaces thereof, comprising: glass plate fixing means for fixing one of the glass plates; an applicator head for applying a spacer forming material and a sealing agent in a layered state; spacer forming material supply means having an extruding means that extrudes the spacer forming material while melting and mixing the material and a fixed displacement pump for supplying the spacer forming material extruded from the extruding means to the applicator head; sealing agent supply means having a fixed displacement pump for supplying the sealing agent to the applicator head; and an articulated robot that moves the applicator head along the periphery of the one of the glass plates.

As described above, since the spacer having the sealing agent layers is formed by use of the spacer forming material supply means having a fixed displacement pump for supplying the spacer forming material to the applicator head and the sealing agent supply means having a fixed displacement pump for supplying the sealing agent to the applicator head, fixed amounts of the spacer forming material and the sealing agent can be constantly applied from the applicator head. Thus, the cross-sectional shapes of the spacer forming material and the sealing agent that have been applied become stable when the application is started and is also finished. Consequently, a stable airtight effect for the air space can be obtained.

Since the spacer forming material supply means having an extruding means for extruding the spacer forming material while melting and mixing the material is adopted, the spacer forming material is not limited to a hot-melt type.

BEST MODES FOR CARRYING OUT THE INVENTION

Embodiments of the present invention will be described in detail below with reference to the accompanying drawings.

Each of FIGS. 1 to 4 shows an example of double glazing manufactured by use of a method of manufacturing double glazing according to the present invention. Double glazing G1 shown in FIG. 1 has glass plates 1 and 2, a spacer 3 disposed between the peripheries 1a and 2a of the glass plates 1 and 2, and an airtightly sealed air space 4 surrounded by the spacer 3 between the glass plates 1 and 2.

Figure 2:
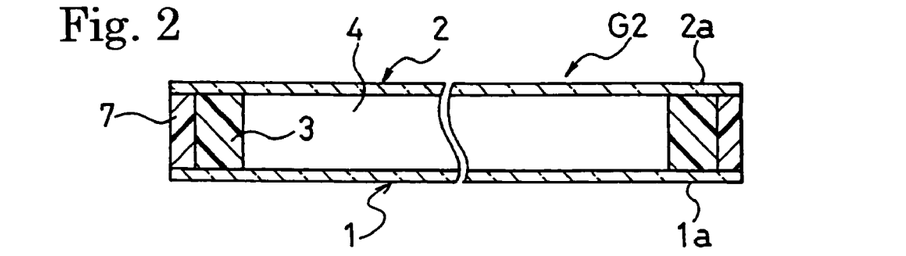
FIG. 2 is a cross-sectional view showing an example of double glazing manufactured by use of a second method of manufacturing double glazing according to the present invention.

Double glazing G2 shown in FIG. 2 has glass plates 1 and 2, a spacer 3 disposed between the peripheries 1a and 2a of the glass plates 1 and 2, an airtightly sealed air space 4 surrounded by the spacer 3 between the glass plates 1 and 2, and a sealing agent layer 7 disposed outwardly of the spacer 3 between the glass plates 1 and 2.

Figure 3:
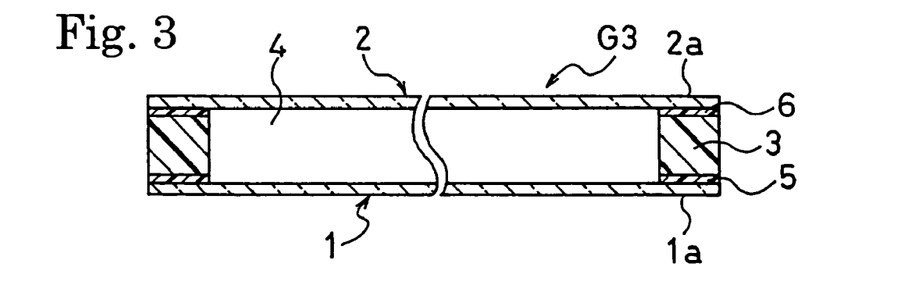
FIG. 3 is a cross-sectional view showing an example of double glazing manufactured by use of a third method of manufacturing double glazing according to the present invention.

Double glazing G3 shown in FIG. 3 has glass plates 1 and 2, a spacer 3 with sealing agent layers 5 and 6 on its upper and lower surfaces, disposed between the peripheries 1a and 2a of the glass plates 1 and 2, and an airtightly sealed air space 4 surrounded by the spacer 3 between the glass plates 1 and 2.

Figure 4:
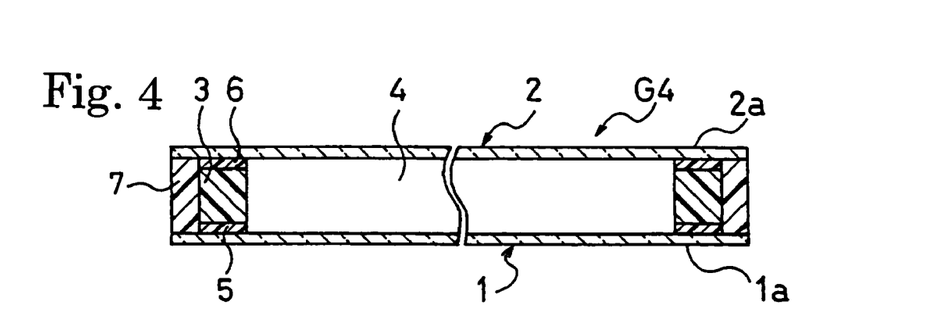
FIG. 4 is a cross-sectional view showing an example of double glazing manufactured by use of a fourth method of manufacturing double glazing according to the present invention.
Figure 5:
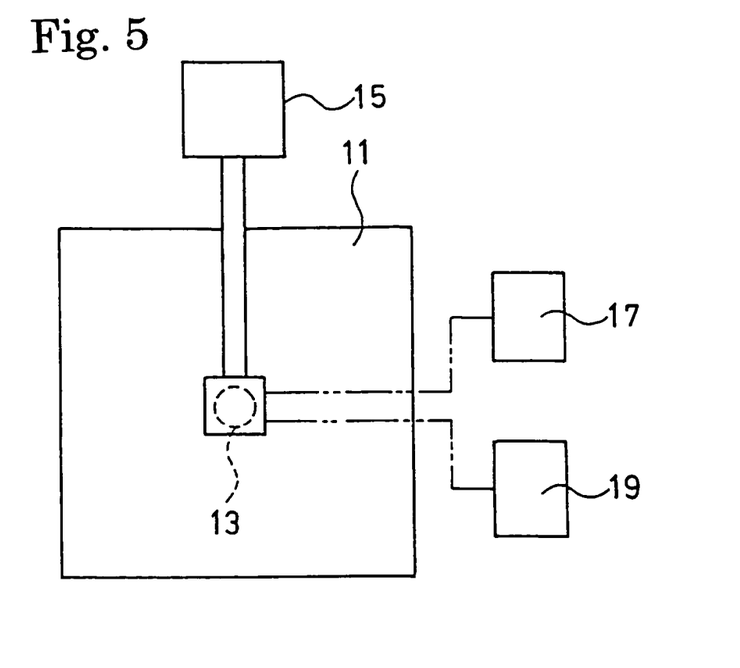
FIG. 5 is a schematic plan view of a spacer forming device according to the present invention.

Double glazing G4 shown in FIG. 4 has glass plates 1 and 2, a spacer 3 with sealing agent layers (primary sealing agent layers) 5 and 6 on its upper and lower surfaces, disposed between the peripheries 1a and 2a of the glass plates 1 and 2, an airtightly sealed air space 4 surrounded by the spacer 3 between the glass plates 1 and 2, and a sealing agent layer (secondary sealing agent layer) 7 disposed outwardly of the spacer 3 between the glass plates 1 and 2.

FIGS. 5 to 12 show an embodiment of a spacer forming device used in manufacturing the double glazing described above. Reference numeral 11 denotes a glass plate fixing means for fixing one glass plate 1, reference numeral 13 denotes an applicator head for applying a spacer forming material and a sealing agent in a layered state onto the glass plate 1, reference numeral 15 denotes an articulated robot which can move the applicator head 13 along the periphery 1a of the glass plate 1, reference numeral 17 denotes a spacer forming material supply means for supplying the spacer forming material to the applicator head 13, and reference numeral 19 denotes a sealing agent supply means for supplying the sealing agent to the applicator head 13.

Figure 6:
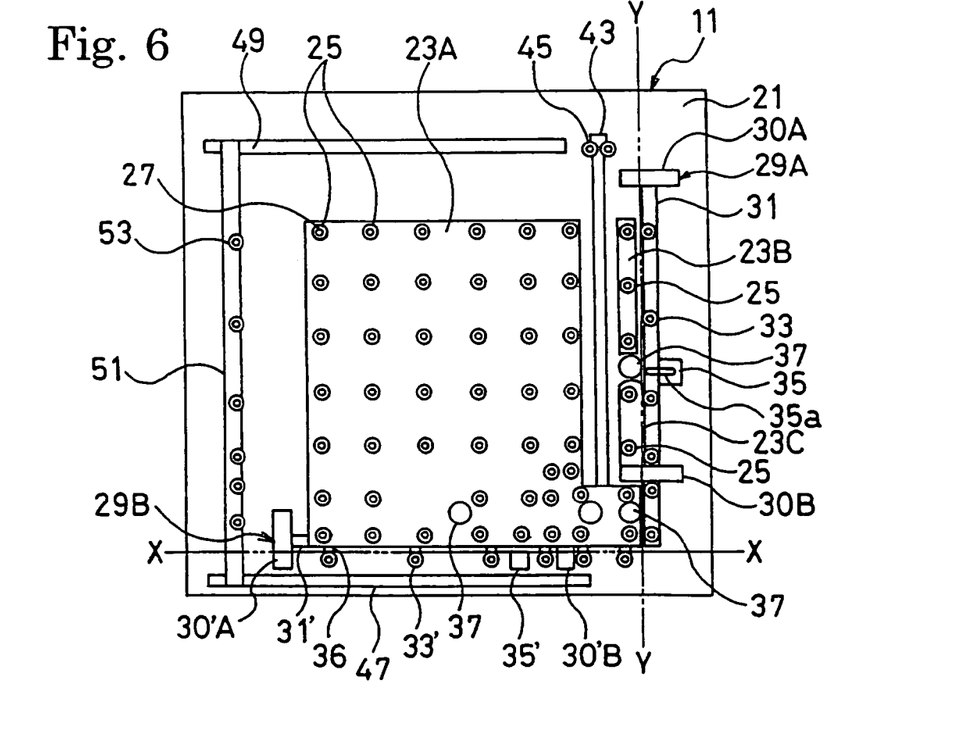
FIG. 6 is an enlarged plan view showing an example of the glass plate fixing means shown in FIG. 5.
Figure 7:
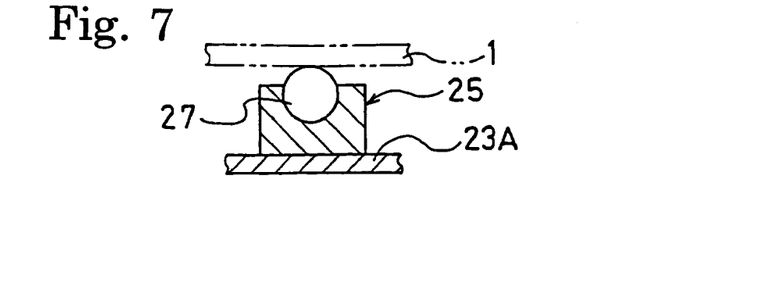
FIG. 7 is an enlarged cross-sectional view of a support member shown in FIG. 6.

As shown in FIG. 6, the glass plate fixing means 11 includes a table 21, support plates 23A to 23C horizontally disposed above the table, and support members 25 for supporting the glass plate 1 placed at predetermined intervals on the support plates. As shown in FIG. 7, each of the support members 25 has a rotatable ball 27 in its upper part and supports the glass plate 1 on this ball 27.

First and second positioning means 29A and 29B for positioning the glass plate 1 are provided outside the support plates 23A to 23C. The first positioning means 29A, which positions one end face of the glass plate 1 along the reference line Y-Y extending back and forth (vertical direction in FIG. 6), includes bearings 30A and 30B fixed to support members (not shown) that are provided vertically on the table 21, and a rotary shaft 31 that is rotatably attached to the bearings and extends parallel to the reference line Y-Y.

Disposed on the rotary shaft 31 at predetermined intervals are rotatable rollers 33 having rotational center axes orthogonal to the rotational center axis of the rotary shaft 31. There is provided an actuator 35 having a vertically extending rod 35a, which are connected to the rotary shaft 31; the rotary shaft 31 is rotated by vertically moving the rod 35a. The rotation of the rotary shaft 31 allows the rollers 33 to move between a positioning location (a location shown in FIG. 6) at which the rotational center axes of the rollers extend vertically and the one end face of the glass plate 1 is positioned along the reference line Y-Y, and a standby location at which the rotational center axes of the rollers extend horizontally.

The second positioning means 29B positions another end face of the glass plate 1 along the reference line X-X extending right and left in FIG. 6. The same constituent members as those of the first positioning means 29A are denoted by the same reference numbers with dashes, and duplicate descriptions will be omitted.

The second positioning means 29B has a rotary shaft 31' and rollers 33' rotatably attached to brackets 36 which protrude on the rotary shaft. By rotating the rotary shaft 31', the rollers 33' move between a positioning location (a location shown in FIG. 6) at which the rotational center axes of the rollers extend vertically and the another end face of the glass plate 1 is positioned along the reference line X-X, and a standby location at which the rotational center axes of the rollers extend horizontally.

Figure 8:
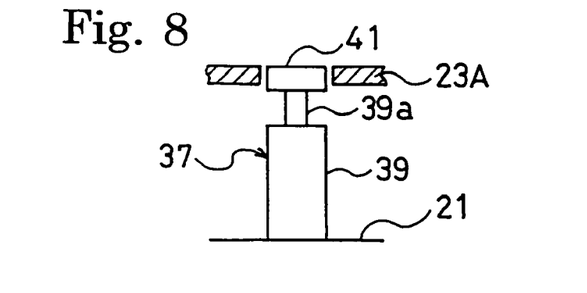
FIG. 8 is an enlarged front view of suction means shown in FIG. 6.

A plurality of suction means 37 that hold by suction the glass plate 1 positioned by the positioning means 29A and 29B are provide on the table 21. As shown in FIG. 8, each of the suction means 37 has an actuator 39 standing on the table 21 and an suction pad 41 fixed to the upper end of the rod 39a of the actuator. When the rod 39a is elongated, the suction pad 41 moves upwardly of the support plates 23A to 23C and holds the glass plate 1 supported by the support members 25 by suction of the lower surface thereof.

Provided between the support plate 23A and the support plates 23B and 23C above the table 21 are a pair of positioning rollers 45, which can move along a guide member 43 extending parallel to the reference line Y-Y.

Guide members 47 and 49 which extend parallel to the reference line X-X are further provided on the front and rear sides of the support plate 23A above the table 21. Positioning rollers 53 are provided at predetermined intervals on a bar 51 which can move along the guide members 47 and 49.

When the glass plate 1 is carried onto the supporting members 25, the rollers 33 and 33' of the positioning means 29A and 29B are moved to the positioning locations. Thereafter, the positioning rollers 45 are moved toward the front side along the guide member 43 by driving means (not shown). Meanwhile, the bar 51 having the positioning rollers 53 attached thereto is moved to the right by driving means (not shown). Accordingly, the glass plate 1 is positioned so as to come into contact with the rollers 33 and 33' of the positioning means 29A and 29B. When the positioning is completed, the suction pads 41 move up to hold the glass plate 1 by suction of the lower surface thereof. When the suction by the suction pads 41 is completed, the rollers 33 and 33' of the positioning means 29A and 29B, the positioning rollers 45, and the bar 51 having the positioning rollers 53 attached thereto return to their standby locations.

Figure 9:
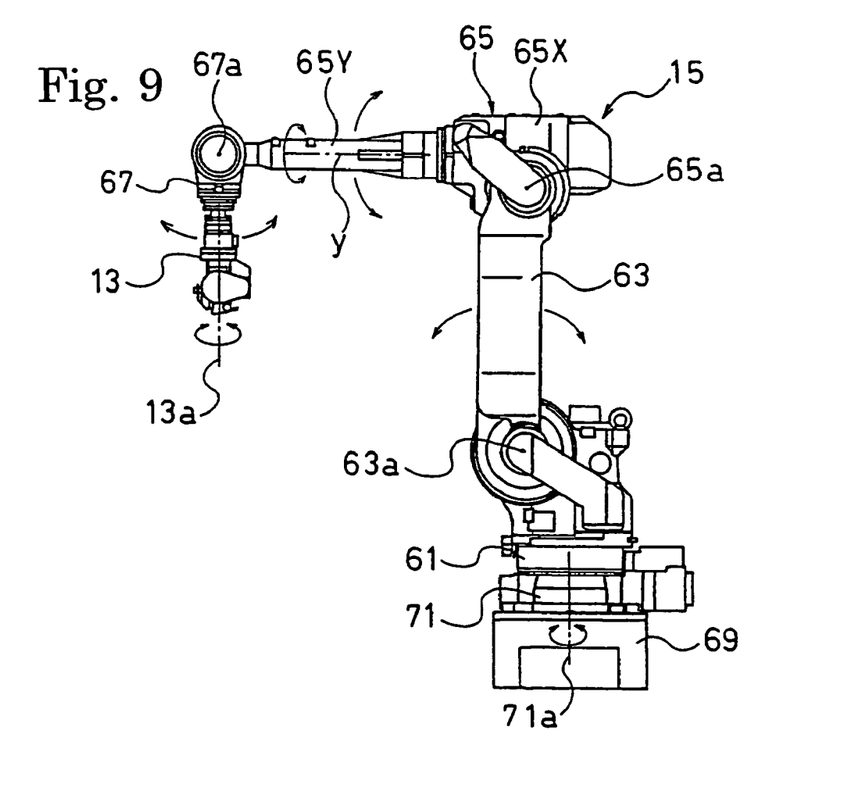
FIG. 9 is a side view showing an example of an articulated robot.

As shown in FIG. 9, the articulated robot 15 includes a rotary table 61, a first swing arm assembly 63, a second swing arm assembly 65 and a third swing arm assembly 67. The rotary table 61 is fixed to the upper end of an axle 71 which protrudes on a base part 69. When the axle 71 rotates around its vertically extending rotational center axis 71a, the rotary table 10 rotates.

The first swing arm assembly 63, which extends vertically, is connected at its lower end to the rotary table 61. The first swing arm assembly 63 can swing back and forth (right and left in FIG. 9) around its swing center axis 63a, horizontally extending right and left, located at its lower end.

The second swing arm assembly 65, which extends back and forth, is connected at its rear end to the upper end of the first swing arm assembly 63. The second swing arm assembly 65 can swing up and down around its swing center axis 65a, horizontally extending right and left, located at its rear end.

The second swing arm assembly 65 comprises a connection arm part 65X connected to the first swing arm assembly 63, and a rotating arm part 65Y which is rotatably attached to the connection arm part 65X. The rotating arm part 65Y rotates around its rotational center axis y extending back and forth.

The third swing arm assembly 67, which extends vertically, is connected at its upper end to the front end of the second swing arm assembly 65. The third swing arm assembly 67 can swing back and forth around its swing center axis 67a, horizontally extending right and left, located at its upper end.

The applicator head 13 is connected at its upper end to the lower end of the third swing arm assembly 67. The applicator head 13 can rotates around its vertically extending rotational center axis 13a.

By activating the articulated robot 15 by use of actuators (not shown) to appropriately operate the rotary table 61, the first swing arm assembly 63, the second swing arm assembly 65 and the third swing arm assembly 67, the applicator head 13 moves along the periphery 1a of the set glass plate 1.

Figure 10:
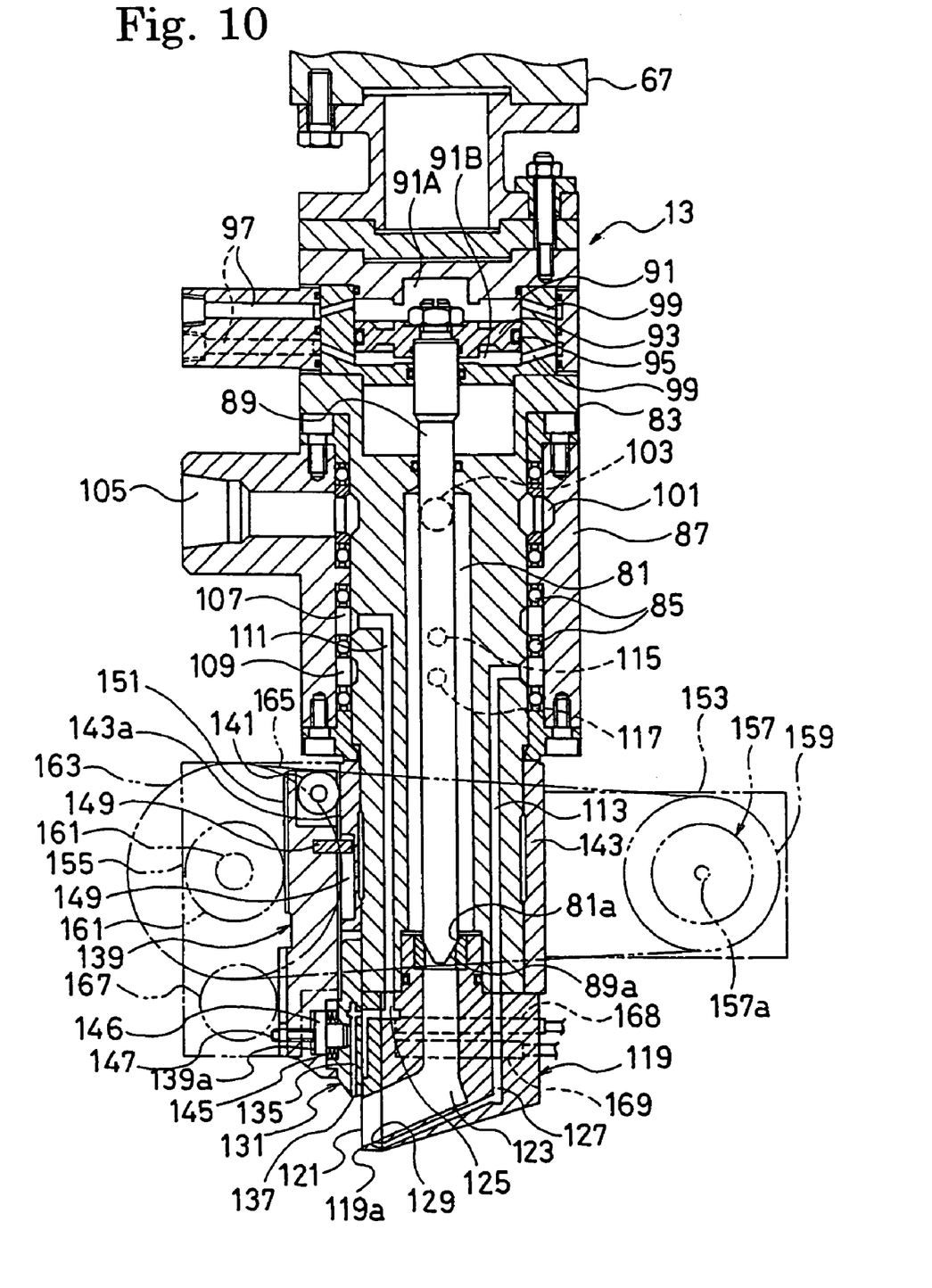
FIG. 10 is an enlarged cross-sectional view showing an example of an applicator head.

FIG. 10 shows one example of the applicator head 13. The applicator head 13 has a cylindrical head body 83 including a vertically extending main passage 81 for a spacer forming material, and an outer cylinder 87 which is rotatably attached to the outer side of the head body via bearings 85 having a sealing function. A vertically extending rod type valve 89 is provided within the main passage 81. The rod type valve 89 has an upper end that extends to a sealed chamber 91 provided in the top of the head body 83. A disc member 93 for moving the rod type valve 89 up and down is fixed to the upper end of the rod type valve 89. The disc member 93 slidably comes into contact with the sidewall surface of the sealed chamber 91 through an O ring 95 for sealing.

The sealed chamber 91 has a upper chamber part 91A and a lower chamber parts 91B separated by the disc member 93, and a supply path 97 for supplying air and a discharge path 99 for discharging air communicate with each of the upper and lower chamber parts 91A and 91B. When air is supplied to the upper chamber part 91A from an air supply source (not shown), the rod type valve 89 moves downward (a state shown in FIG. 10), whereby the inclined bottom plane 89a of the rod type valve 89 comes into contact with the inclined wall surface 81a of the main passage 81 to close the main passage 81. When air is supplied to the lower chamber part 91B, the rod type valve 89 moves upward, whereby the inclined bottom plane 89a of the rod type valve 89 separates from the inclined wall surface 81a of the main passage 81 to open the main passage 81.

A circular path 101 for supplying the spacer forming material supplied from the spacer forming material supply means 17 to the main passage 81 is formed between the head body 83 and the outer cylinder 87. The circular path 101 communicates with the main passage 81 through radially extending paths 103. The spacer forming material supplied from the spacer forming material supply means 17 is supplied to the circular path 101 through a supply path 105 formed in the outer cylinder 87 and further to the main passage 81 through the paths 103.

Two circular paths 107 and 109 for the sealing agent supplied from the sealing agent supply means 19 are further provided between the head body 83 and the outer cylinder 87. First paths 111 and 113 that extend to the lower end of the head body 83 communicate with the upper circular path 107 and the lower circular path 109, respectively. The sealing agent is supplied from the sealing agent supply means 19 to the circular paths 107 and 109 through supply paths 115 and 117 formed in the outer cylinder 87.

A die 119 is fixed to the lower end of the head body 83. A discharge port 121 for discharging the spacer forming material is open to a side 119a of the die 119. The discharge port 121, which extend vertically and laterally, communicates with the main passage 81 through a discharge path 123 formed in the die 119. Second paths 125 and 127 that communicate with the first paths 111 and 113, respectively, are formed in the die 119. The second path 127 in communication with the first path 113 has an opening 129 that is open to the lower wall surface of the discharge path 123 near the discharge port 121, and the sealing agent for forming the lower sealing agent layer 5 is discharged form the opening 129.

A gate 131 which opens and closes the discharge port 121 is provided on the side 119a of the die 119 so as to be slidable up and down. A third path 135 communicating with the second path 125 is formed in the gate 131. The third path 135 has an opening 137 that is open to the lower end of the gate 131, and the sealing agent for forming the upper sealing agent layer 6 is discharged from the opening 137. The applicator head 13 can apply the spacer forming material and the sealing agent in a layered state by discharging the spacer forming material from the discharge port 121 and the sealing agent from the openings 129 and 137.

A lifting body 139 for moving up and down the gate 131 is provided outside the gate 131. A rotatably supported roller 141 is provided at the upper end of the lifting body 139. A cylindrical member 143 is fixed to the lower part of the head body 83, and the roller 141 comes into contact with the outer surface 143a of the cylindrical member 143. The lifting body 139 has a recess 139a formed in the lower end, and a pin 146 having a spring washer 145 attached thereto is placed in the recess 139a, the spring washer 145 constantly pushing the gate 131 toward the die 119. By moving a bolt 147 having a protruding tip into or out of the recess 139a, the pushing force of the spring washer 145 can be adjusted.

A stopper pin 149 engaged with a vertically long groove 149 provided in the outer surface 143a of the cylindrical member 143 protrudes from the lifting body 139. The stopper pin 149 prevents the lifting body 139 from falling by accident. Formed on the outer surface of the upper part of the lifting body 139 is a rack 151, which is engaged with a pinion gear described later.

Brackets 153 and 155 are fixed to the cylindrical member 143. A motor 157 for moving up and down the lifting body 139 is attached to the bracket 153. A pulley 159 is fixed to the rotation axis 157a of the motor 157.

A rotary shaft 161A is rotatably supported by the bracket 155, and a pinion gear 161 engaged with the rack 151 and a pulley 163 for transmitting rotation of the motor 157 to the rotary shaft 161 are fixed to the rotary shaft 161. A belt 165 extends around the pulleys 159 and 163. A guide roller 167 for guiding the lifting body 139 is rotatably provided on the bracket 155 below the pinion gear 161.

When the motor 157 rotates in one direction, the lifting body 139 moves down, thereby moving the gate 131 locked thereto downward to reduce the height of the discharge port 121. When the motor 157 rotates in the other direction, the lifting body 139 moves up, which moves the gate 131 upward to increase the height of the discharge port 121. By lifting up or down the gate 131, the height of the discharge port 121 is adjusted, whereby the thickness of the spacer forming material discharged from the discharge port 121 can be adjusted.

Reference numeral 168 denotes a temperature measuring means for measuring the temperature of the spacer forming material flowing in the discharge path 123 of the die 119, and reference numeral 169 denotes a heating means for heating the spacer forming material flowing in the discharge path 123. When the temperature measured by the temperature measuring means 168 gets below a predetermined temperature, the heating means 169 is turned on to heat the spacer forming material flowing in the discharge path 123.

Figure 11:
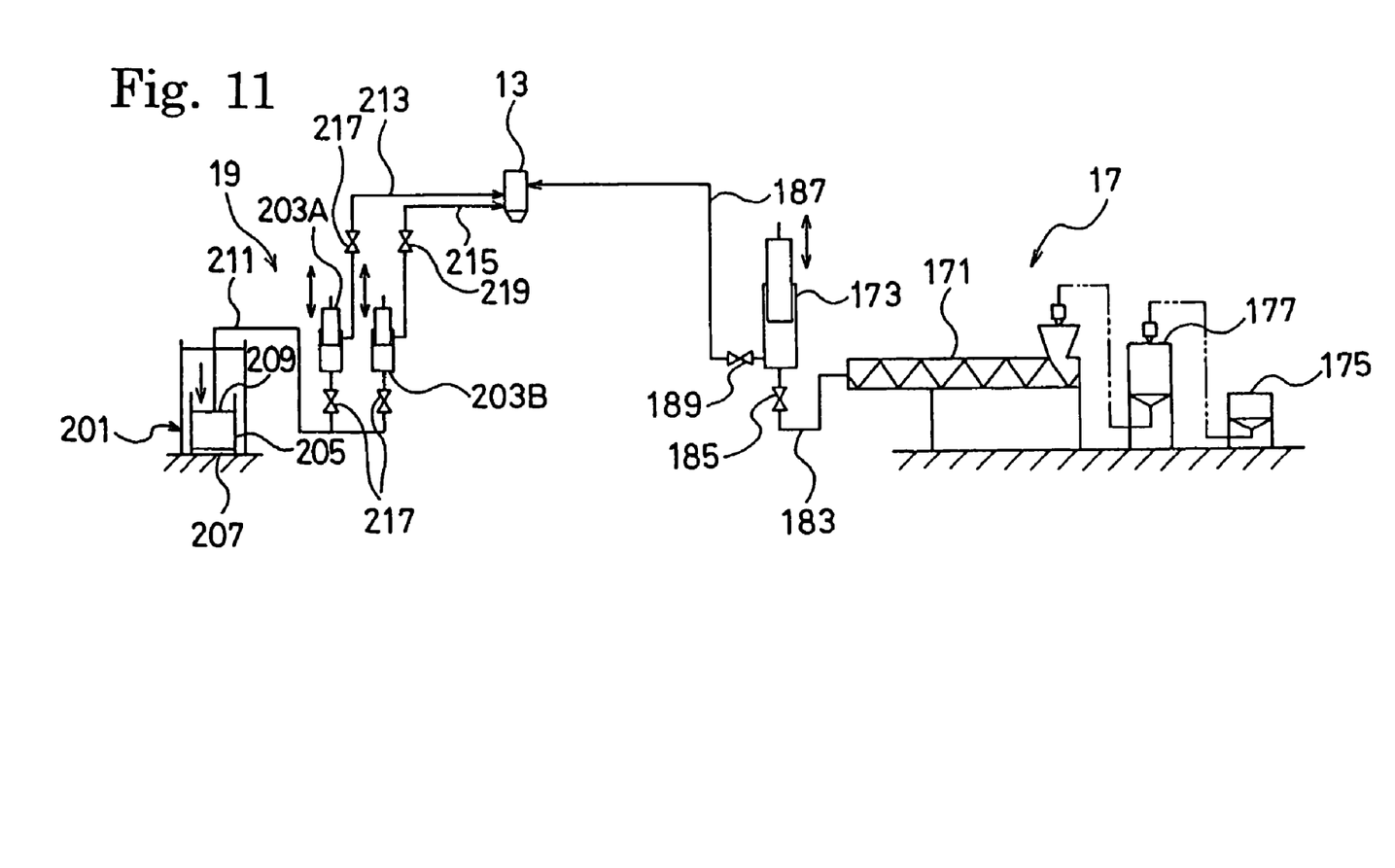
FIG. 11 is an explanatory view of spacer forming material supply means and sealing agent supply means.

As shown in FIG. 11, the spacer forming material supply means 17 for supplying the spacer forming material and the sealing agent supply means 19 for supplying the sealing agent are connected to the applicator head 13.

The spacer forming material supply means 17 includes: a screw extruder (extruding means) 171 for extruding the spacer forming material while melting and mixing the material; a fixed displacement pump 173 for supplying the spacer forming material extruded from the extruder 171 to the applicator head 13; a supply unit 175 for supplying pellets of the spacer forming material to the extruder 171; and a drying means 177 for drying the pellets of the spacer forming material which have been supplied from the supply unit 175.

Figure 12:
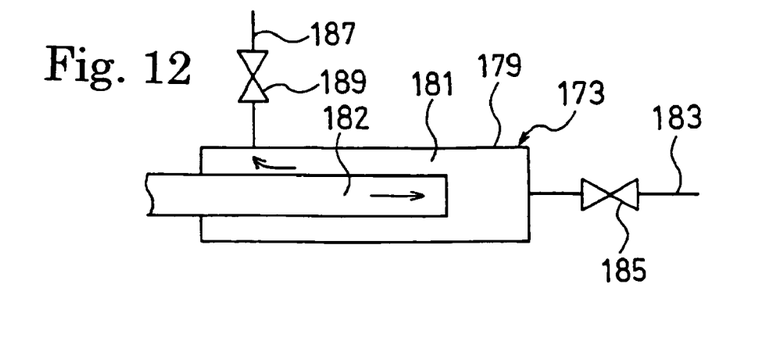
FIG. 12 is a partial enlarged view showing an example of a fixed displacement pump.

As shown in FIG. 12, the fixed displacement pump 173 includes a pump housing 179 having a pump chamber 181, and an extrusion rod 182 which is slidably inserted into the pump chamber. When the spacer forming material in the pump chamber 181 is supplied to the applicator head 13, the extrusion rod 182 is moved forward in the direction indicated by the arrow by driving means (not shown). When the spacer forming material is fed to the pump chamber 181 from the extruder 171, the extrusion rod 182 is moved backward by an extrusion pressure of the spacer forming material extruded from the extruder 171.

A pipe 183 that connects the extruder 171 to the fixed displacement pump 173 is connected to the tip of the pump housing 179. An inlet valve 185 is installed relative to the pipe 183. A pipe 187 that connects the fixed displacement pump 173 to the applicator head 13 is connected to the rear part of the pump housing 179. An outlet valve 189 is installed relative to the pipe 187.

When the inlet valve 183 is open and the outlet valve 187 is closed, the spacer forming material extruded from the extruder 171 is fed into the pump chamber 181. When the inlet valve 183 is closed and the outlet valve 187 is open, the extrusion rod 182 is moved forward in the direction indicated by the arrow by the driving means (not shown), whereby the spacer forming material in the pump chamber 181 is forced out and supplied to the applicator head 13.

As described above, a configuration is adopted, in which the pipe 183 connected to the extruder 171 is connected to the tip of the pump housing 179 and the pipe 187 connected to the applicator head 13 is connected to the rear part of the pump housing 179. Accordingly, the spacer forming material supplied into the pump chamber 181 from the tip of the pump housing 179 can be sequentially supplied to the applicator head 13 from the rear part of the pump housing 179. Thus, even when a spacer 3 of a different size is formed, the spacer forming material first supplied into the pump chamber 181 can always be supplied to the applicator head 13. Consequently, the spacer forming material first supplied into the pump chamber 181 is never accumulated.

The sealing agent supply means 19 includes a supply source 201 for supplying a hot-melt type sealing agent and two fixed displacement pumps 203A and 203B for supplying the sealing agent from the supply source 201 to the applicator head 13. The supply source 201 has a container 205 which houses the sealing agent and a heating means 207 such as an electric heater for heating the sealing agent in the container 205. A ram 209 for pressurizing the sealing agent is disposed in the container 205. By pressing down the ram 209, the sealing agent in the container 205 is pressurized, whereby the sealing agent is supplied to the fixed displacement pumps 203A and 203B through pipes 211 connected to the ram 209.

The fixed displacement pumps 203A and 203B each have the same structure as that of the fixed displacement pump 173 described above. Inlet valves 217 are attached to the pipes 211, which connect the fixed displacement pumps 203A and 203B to the supply source 201, and outlet valves 219 are attached to pipes 213 and 215, which connect the fixed displacement pumps 203A and 203B to the applicator head 13.

The methods of manufacturing double glazing of the present invention will be described below by use of the spacer forming device described above.

Figure 13:
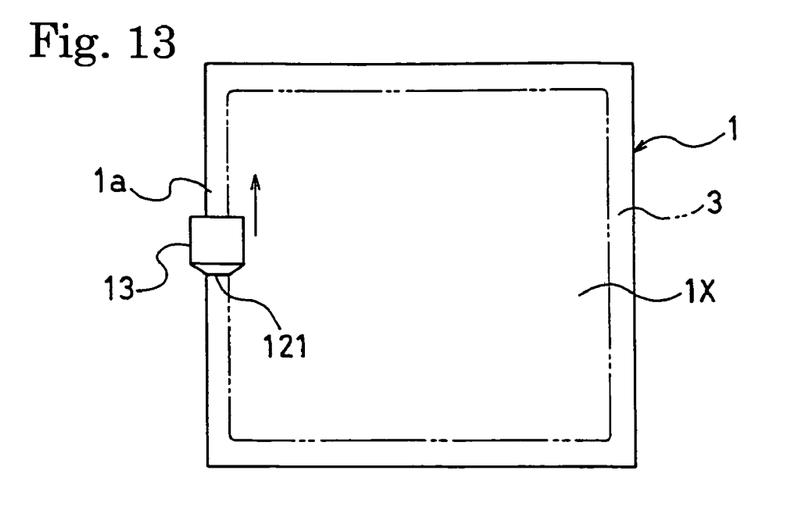
FIG. 13 is a plan view showing an application step by the applicator head in the first and third methods of manufacturing double glazing of the present invention.

First, a method of manufacturing the double glazing G3 shown in FIG. 3 (a third method) will be described. One glass plate 1 is carried onto the support members 25 of the glass plate fixing means 11 and is positioned to be set as described above. The articulated robot 15 is activated to position the applicator head 13 at an application start position above the periphery 1a of the upper surface 1X of the glass plate 1, as shown in FIG. 13.

Next, the spacer forming material and the sealing agent are discharged from the discharge port 121 and the openings 129 and 137 of the applicator head 13. Meanwhile, the applicator head 13 moves along the periphery 1a. The spacer forming material and the sealing agent are applied onto the periphery 1a from the applicator head 13 so as to form a strip-shaped layered body including a spacer 3 and sealing agent layers 5 and 6 layered on the upper and lower surfaces of the spacer 3. By moving the applicator head 13 along the periphery 1a to make a circuit thereof, the spacer 3 having the sealing agent layers 5 and 6 on the upper and lower surfaces is formed thereon.

After formation of the spacer, the glass plate 1 with the spacer is moved to a cooling step and cooled there. Thus, the spacer forming material is hardened to secure a predetermined thickness which specifies the thickness of the air space 4. After cooling, the other glass plate 2 is attached by press to the spacer 3 via the upper sealing agent layer 6, obtaining the double glazing G3 shown in FIG. 3.

Figure 1:
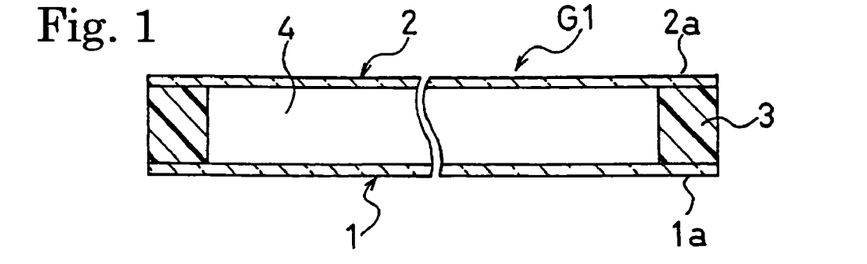
FIG. 1 is a cross-sectional view showing an example of double glazing manufactured by use of a first method of manufacturing double glazing according to the present invention.

A method of manufacturing the double glazing G1 shown in FIG. 1 (a first method) is different from the above-described method of manufacturing the double glazing G3 in that the spacer 3 is formed by supplying only the spacer forming material to the applicator head 13 without supplying the sealing agent to the applicator head 13. The other steps are the same as those described above. Thus, the spacer forming device used for manufacturing the double glazing G1 may have no sealing agent supply means 19 for supplying the sealing agent to the applicator head 13, and the applicator head 13 may have a configuration having no path for the sealing agent.

Figure 14:
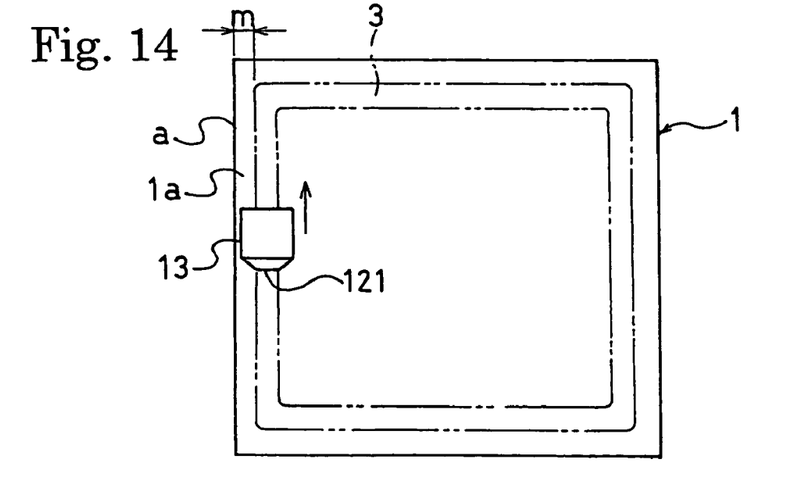
FIG. 14 is a plan view showing an application step by the applicator head in the second and fourth methods of manufacturing double glazing of the present invention.

In a method of manufacturing the double glazing G4 shown in FIG. 4 (a fourth method), one glass plate 1 is carried onto the support members 25 of the glass plate fixing means 11 and is positioned to be set as described above. Thereafter, the articulated robot 15 is activated to position the applicator head 13 at an application start position spaced away from the edge a of the periphery 1a by a predetermined length m, as shown in FIG. 14.

Next, as in the case of the method of manufacturing the double glazing G3 shown in FIG. 3, the step of forming the spacer 3, the cooling step and the press-attaching step are performed. After the press-attaching step is finished, a secondary sealing agent is applied from a secondary sealing agent application means (not shown) over the entire periphery in a space outward of the spacer 3 between the glass plates 1 and 2 to form a secondary sealing agent layer 7, obtaining the double glazing G4 shown in FIG. 4.

A method of manufacturing the double glazing G2 shown in FIG. 2 (a second method) is different from the above-described method of manufacturing the double glazing G4 in that the spacer 3 is formed by supplying only the spacer forming material to the applicator head 13 without supplying the sealing agent to the applicator head 13. The other steps are the same as those described above. Therefore, the spacer forming device may have no sealing agent supply means 19 for supplying the sealing agent to the applicator head 13, and the applicator head 13 may have a configuration having no path for the sealing agent.

According to the third and fourth methods described above, the spacer 3 is formed by use of the spacer forming material supply means 17 having a fixed displacement pump 173 for supplying the spacer forming material to the applicator head 13 and the sealing agent supply means 19 having fixed displacement pumps 203A and 203B for supplying the sealing agent to the applicator head 13. Accordingly, fixed amounts of the spacer forming material and the sealing agent can be constantly applied from the applicator head 13. Thus, it is possible to prevent the cross-sectional shapes of the spacer forming material and the sealing agent that are applied from becoming unstable when the application is started and finished. Therefore, a stable airtight effect for the air space 4 can be ensured.

According to the first and second methods described above also, the spacer 3 is formed by use of the spacer forming material supply means 17 having a fixed displacement pump 173 for supplying the spacer forming material to the applicator head 13. Thus, the cross-sectional shape of the spacer forming material does not becomes unstable.

By adopting the spacer forming material supply means 17 having a extruder 171 that extrudes the spacer forming material while melting and mixing the material, a spacer forming material other than that of the hot-melt type can also be melted and mixed by the extruder 171 and supplied to the applicator head 13. Thus, the spacer forming material is not limited to the hot-melt type, but various types of spacer forming materials can be used to form the spacer 3.

Since the gate 131 which can open and close the discharge port 121 of the applicator head 13 is provided, the thickness of the spacer forming material discharged from the discharge port 121 can be easily adjusted by lifting up or down the gate 131 without replacing the die 119.

Figure 15:
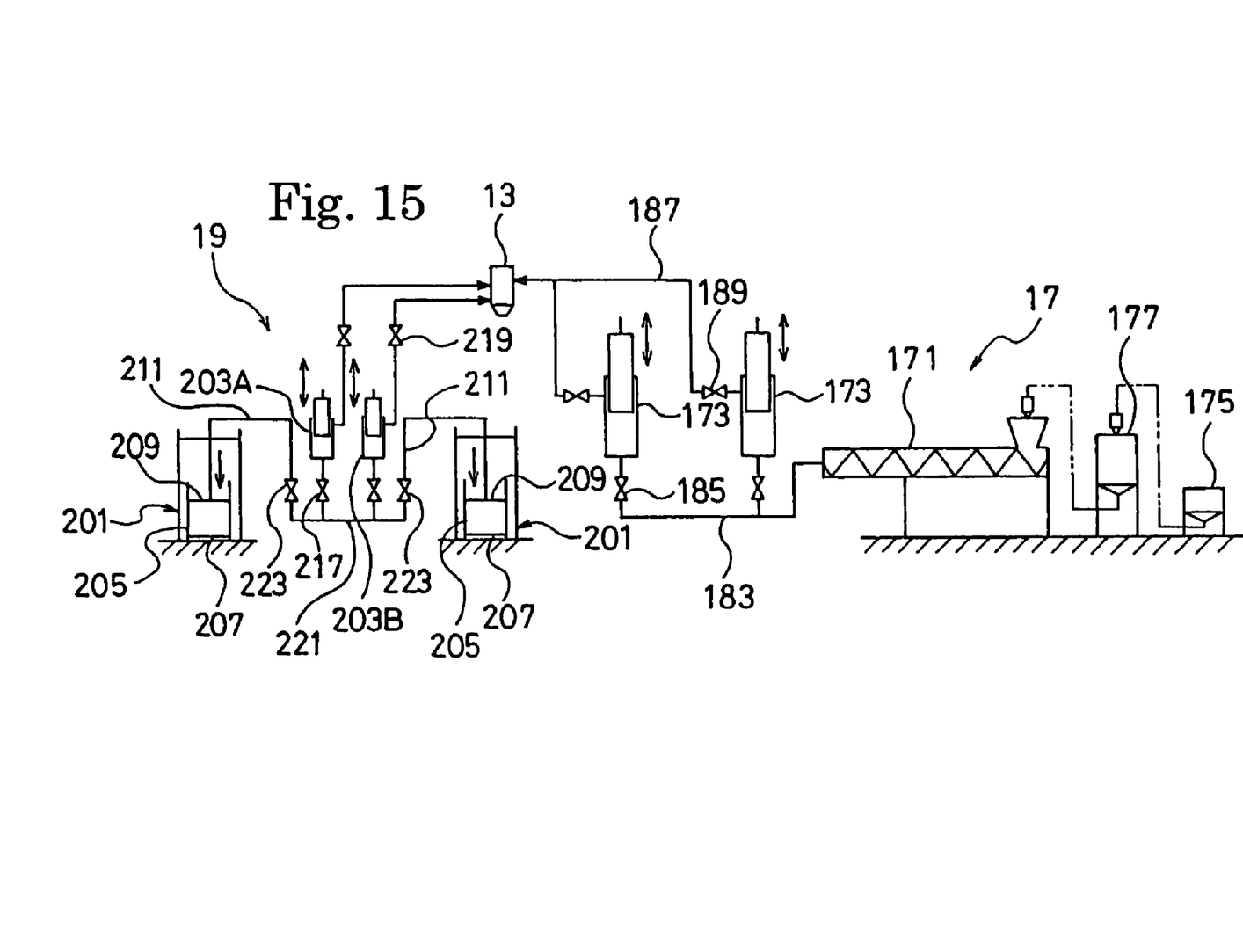
FIG. 15 is an explanatory view showing a preferred example of the spacer forming material supply means and the sealing agent supply means.

FIG. 15 shows a preferred example of the spacer forming material supply means 17 and the sealing agent supply means 19. The spacer forming material supply means 17 shown in FIG. 15 is arranged such that two fixed displacement pumps 173 are connected in parallel to the extruder 171.

The sealing agent supply means 19 has two sealing agent supply sources 201. One of the sealing agent supply sources 201 is connected to the fixed displacement pump 203A, and the other of the sealing agent supply sources 201 is connected to the fixed displacement pump 203B. Two pipes 211 connected to the two sealing agent supply sources 201 are connected to each other through a connection pipe 221. Opening and closing valves 223 are attached to the pipe 211, respectively.

According to the spacer forming material supply means 17, while the spacer forming material is supplied to the applicator head 13 by one of the fixed displacement pumps 173, the other of the fixed displacement pumps 173 can be charged with the spacer forming material from the extruder 171. Thus, the spacer 3 is formed by using the one of the fixed displacement pumps 173 and, subsequently, the next spacer 3 can be formed by using the other of the fixed displacement pumps 173. Consequently, productivity can be enhanced compared with the case shown in FIG. 11 where one fixed displacement pump is used. The number of the fixed displacement pumps 173 is not limited to two, but three or more of the pumps may be provided.

According to the sealing agent supply means 19, by connecting the pipes 211 to each other through the connection pipe 221, when one of the sealing agent supply sources 201 runs out of the sealing agent, the sealing agent can be supplied to the two fixed displacement pumps 173 from the other sealing agent supply source 201. Thus, productivity can be enhanced compared with the case shown in FIG. 11 where one sealing agent supply source 201 is provided.

Figure 16:
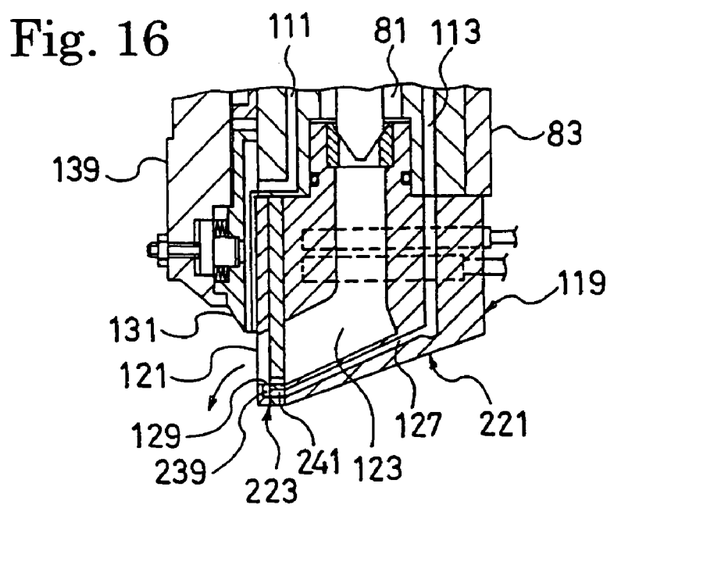
FIG. 16 is an enlarged cross-sectional view showing another example of a die.

FIG. 16 shows another example of the die 119. The die 119 shown in FIG. 16 is preferably used in the case where the thickness of the air space 4 is set to be 12 mm or more. When the spacer 3 is formed by using the applicator head 13 described above so as to set the thickness of the air space 4 to be 12 mm or more, the flow rate of the spacer forming material flowing in the upper side of the discharge path 123 is higher than that of the material flowing in the lower side the discharge path 123. Thus, the spacer forming material is discharged from the discharge port 121 of the applicator head 13 while being curved downward as indicated by the arrow in FIG. 16.

If the applicator head 13 is moved in accordance with the flow rate in the lower side, too much spacer forming material is applied in the upper side. As a result, the spacer 3 falls down. If the applicator head 13 is moved in accordance with the flow rate in the upper side, the lower side of the spacer forming material applied is pulled. Thus, the lower portion of the spacer that has been pulled contracts after formation of the spacer, and the spacer 3 is twisted.

Figure 17:
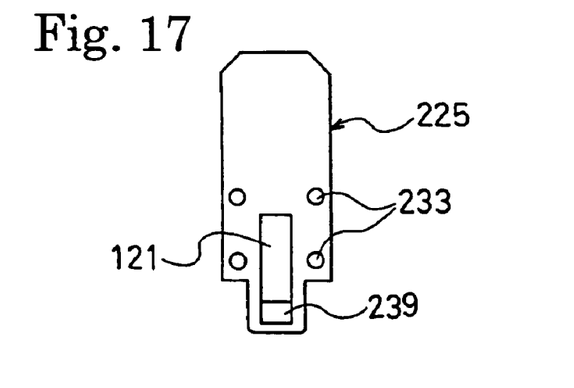
FIG. 17 is an enlarged front view of a discharge plate of the die shown in FIG. 16.
Figure 18:
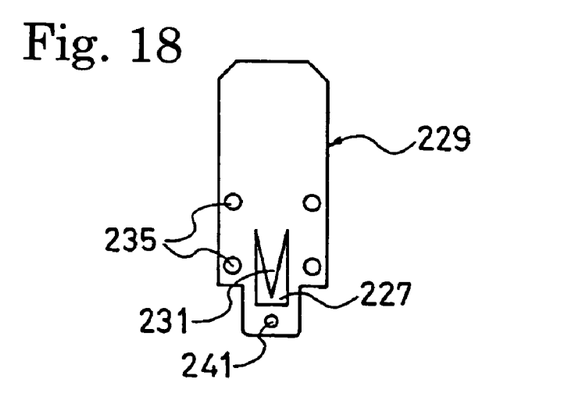
FIG. 18 is an enlarged front view of a flow rate regulating plate of the die shown in FIG. 16.

The die 119 shown in FIG. 16 solves the problems described above. The die 119 comprises a main die part 221 that is fixed to the lower end of the head body 83 and assistant die members 223 which are detachably fixed to the main die part 221. The assistant die members 223 comprise a discharge plate 225 having the delivery port 121 described above as shown in FIG. 17, and a flow rate regulating plate (flow rate regulating means) 229 for regulating the speed of discharging the spacer forming material as shown in FIG. 18, the flow rate regulating plate having a vertically extending opening 227.

A V-shaped protrusion 231 protrudes into the opening 227 from, the upper side thereof. The cross-sectional area of the opening 227 is gradually decreased from the lower side toward the upper side by the protrusion 231. The discharge plate 225 and the flow rate regulating plate 229 have bolt holes 233 and 235 formed therein. The assistant die members 223 are fixed to the main die part 221 by use of bolts (not shown) which are inserted into the bolt holes 233 and 235 in a state where the two plates 225 and 229 are stacked so as to allow the opening 227 of the flow rate regulating plate 229 to overlap with the discharge port 121 of the discharge plate 225. The opening 227 of the flow rate regulating plate 229 fixed to the main die part 221 is positioned in the discharge path 123 near the discharge port 121. In FIGS. 16 to 18, reference numeral 239 denotes a recess in the discharge plate 225 that forms a portion of the second path 127 of the die 119, and reference numeral 241 denotes a through-hole in the flow rate regulating plate 229 that forms a portion of the second path 127 of the die 119.

As described above, by providing the flow rate regulating plate 229 in which the cross-sectional area of the opening 227 is smaller in the upper side than in the lower side, the flow rate of the spacer forming material flowing in the upper side of the discharge path 123 near the discharge port 121 can be set lower than that of the material flowing in the lower side. Thus, the difference between the flow rate of the spacer forming material flowing in the upper side and that of the material flowing in the lower side, discharged from the discharge port 121, is reduced. Consequently, the problems of the falling and twisting of the spacer 3 can be improved to thereby obtain a good appearance.

The protrusion 231 is not limited to the V shape described above, but may have other shapes, if the above opening 227 can be gradually smaller in cross-sectional area toward the upper side. It is preferable that a plurality of flow rate regulating plates 229 having openings 227 that are different in cross-sectional area be prepared, and the flow rate regulating plate be appropriately replaced according to the type and viscosity of the spacer forming material.

In the present invention, the spacer forming material of which the spacer 3 is formed may includes a conventionally well-known spacer forming material made of rubber, thermoplastic resin, thermoplastic elastomer or the like mixed with a drying agent. Preferably, a thermoplastic material such as thermoplastic resin or thermoplastic elastomer, for example, a thermoplastic elastomer composition disclosed in Japanese patent application Kokai publication No. 2000-119537 or a sealing agent composition including a spacer function and a sealing function, disclosed in Japanese patent application Kokai publication No. 2001-354949, is used for the spacer forming material.

The sealing agent used for the sealing agent layers 5 and 6 is not particularly limited as long as the agent has a function of sealing the glass plates 1 and 2; for example, a hot-melt type adhesive formed of a butyl sealing agent composition or the like may be used.

Examples of the glass plates 1 and 2 used for double glazing may generally include glass plates for windows, doors and so on widely used in building materials, vehicles and the like, reinforced glass plates, glass plates in which metal lathe is embedded, glass plates having inner surfaces thinly coated with metal or other inorganic substances such as heat-ray absorbing glass plates, and acrylic resin plates and polycarbonate plates called organic glass plates.

In the embodiments described above, double glazing having two glass plates 1 and 2 has been described, but double glazing may be one having three or more glass plates and spacers disposed between the respective glass plates.

INDUSTRIAL APPLICABILITY

The present invention having the above beneficial effects can be very effectively utilized to manufacture double glazing for the purpose of heat insulation, dew condensation prevention, sound insulation and the like in a construction field, an automobile field and the like.

What is claimed is:

1. A method of manufacturing double glazing having glass plates, a spacer disposed between peripheries of the glass plates, and an airtightly sealed air space surrounded by the spacer between the glass plates, the method using a spacer forming device including an applicator head for applying a spacer forming material, and spacer forming material supply means having an extruding means that extrudes the spacer forming material while melting and mixing the material and a fixed displacement pump for supplying the spacer forming material extruded from the extruding means to the applicator head, wherein, at a tip end of a pump housing of the fixed displacement pump, a pipe is connected to the extruding means and at a rear part of an outer surface of the pump housing, a pipe is connected to the applicator head and further, an extrusion rod is provided in a pump chamber of the pump housing which is slidably inserted from a top portion of the pump housing opposite to the tip end of the pump housing, the method comprising the steps of:

feeding the spacer forming material to the pump chamber such that the extrusion rod is moved backward by extrusion pressure of the spacer forming material extruded from the extruding means;

supplying the spacer forming material fed into the pump chamber to the applicator head by the extrusion rod being moved forward, which causes all of the spacer forming material displaced by the extrusion rod and supplied to the applicator head to pass through between the inner peripheral surface of the pump housing and the outer peripheral surface of the extrusion rod;

applying the spacer forming material from the applicator head along the periphery of an upper surface of one of the glass plates thereon to form the spacer; and attaching by press the other one of the glass plates to the spacer.

2. A method of manufacturing double glazing according to claim 1, wherein the spacer forming material is a thermoplastic material.

3. A method of manufacturing double glazing according to claim 1, wherein a plurality of fixed displacement pumps are connected in parallel to the extruding means, and while the spacer forming material is supplied to the applicator head by one of the fixed displacement pumps, the spacer forming material is charged to another fixed displacement pump.

* * * * *